United States Patent
Boes et al.

(10) Patent No.: US 6,953,071 B2
(45) Date of Patent: Oct. 11, 2005

(54) PNEUMATIC TIRE HAVING AN OUTER LAYER OF A FLUORINATED SILANE COATING

(75) Inventors: Claude Ernest Felix Boes, Erpeldange (LU); Rene Jean Zimmer, Howald (LU); Georges Marcel Victor Thielen, Schouweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 290 days.

(21) Appl. No.: 10/308,694

(22) Filed: Dec. 3, 2002

(65) Prior Publication Data

US 2004/0103966 A1 Jun. 3, 2004

(51) Int. Cl.[7] .......................... B60C 1/00; B60C 11/00; B60C 13/00
(52) U.S. Cl. ..................... 152/209.5; 152/524; 152/525
(58) Field of Search ............................. 152/209.5, 525, 152/524

(56) References Cited

U.S. PATENT DOCUMENTS

| | | | | |
|---|---|---|---|---|
| 4,257,836 | A | 3/1981 | Beneze | 156/125 |
| 4,572,918 | A | 2/1986 | Lee et al. | 521/91 |
| 4,706,910 | A | 11/1987 | Walsh et al. | 244/130 |
| 4,736,048 | A | 4/1988 | Brown et al. | 556/454 |
| 4,842,902 | A | 6/1989 | Brown et al. | 427/387 |
| 4,865,271 | A | 9/1989 | Savill | 244/130 |
| 4,889,753 | A | 12/1989 | Brown et al. | 428/40 |
| 5,041,588 | A | 8/1991 | Caporiccio | 556/413 |
| 5,274,159 | A | * 12/1993 | Pellerite et al. | 556/485 |
| 5,851,674 | A | 12/1998 | Pellerite et al. | 428/421 |
| 5,980,992 | A | 11/1999 | Kistner et al. | 427/384 |
| 6,277,485 | B1 | 8/2001 | Invie et al. | 428/336 |

FOREIGN PATENT DOCUMENTS

| | | | | |
|---|---|---|---|---|
| EP | 0 837 096 A1 | 4/1998 | | C08L 21/00 |
| JP | 5-208454 | * 8/1993 | | |

* cited by examiner

Primary Examiner—Steven D. Maki
(74) Attorney, Agent, or Firm—John D. DeLong

(57) ABSTRACT

A pneumatic tire having a tread and an outer-facing sidewall area extending from opposing edges of a belt reinforcing structure to corresponding tire beads, the improvement comprising an outer layer of a coating of a fluorinated silane.

11 Claims, 1 Drawing Sheet

PNEUMATIC TIRE HAVING AN OUTER LAYER OF A FLUORINATED SILANE COATING

BACKGROUND OF THE INVENTION

Pneumatic tires and, in particular when used off-the-road, typically collect mud and dirt on the sidewall, as well as the lettering on the tire. This results in an unsightly tire. The purpose of the present invention is to reduce the amount of dirt which adheres to the sidewall and lettering by applying a coating of a fluorinated silane over the existing tire sidewall. The coating provides an automatic cleaning effect decreasing the need for scrubbing the sidewall.

Pneumatic tires also collect water in the tread grooves. The purpose of the present invention is also to reduce the adhesion of water and mud inside the grooves, by applying a coating of fluorinated silane to the groove walls, thus obtaining a better evacuation of water as well as a self-cleaning effect.

A clean and dry tire also reduces the weight of the tires as well as the air resistance, thus reducing the fuel consumption. Efforts to reduce air resistance of objects in motion in order to achieve a reduction in fuel consumption have been disclosed for surfaces such as the metallic surface of an airplane. For example, U.S. Pat. No. 4,865,271 by Savill teaches to provide an aerodynamic or hydrodynamic surface with so-called "riblets" for reducing drag by modification of the turbulent boundary layer, which is the thin layer of air molecules that touches the surface of the object and causes friction. The riblets comprise flow-aligned elongate projections of small height.

U.S. Pat. No. 4,706,910 by Walsh et al. discloses a system of flow control devices which result in reduced skin friction on aerodynamic surfaces. The devices cause a breakup of large-scale disturbances in the boundary layer of the flow field by the use of longitudinal striations forming V-shaped grooves.

Against this background, it is an object of the present invention to provide rubber tires that have an improved dirt-repellence whereby the weight of the tire and, consequently the air resistance, are reduced and savings in fuel consumption are obtained.

It is another object of the invention to provide tires having a self-cleaning effect and permitting a reduction of cleaning material to be used.

SUMMARY OF THE INVENTION

The present invention relates to a pneumatic tire having a fluorinated silane coating applied to the outer surface to decrease the dirt adhesion to the sidewall of the tire. The treated outer surface may be the sidewall and/or the tread grooves.

DETAILED DESCRIPTION OF THE INVENTION

Figure 1:
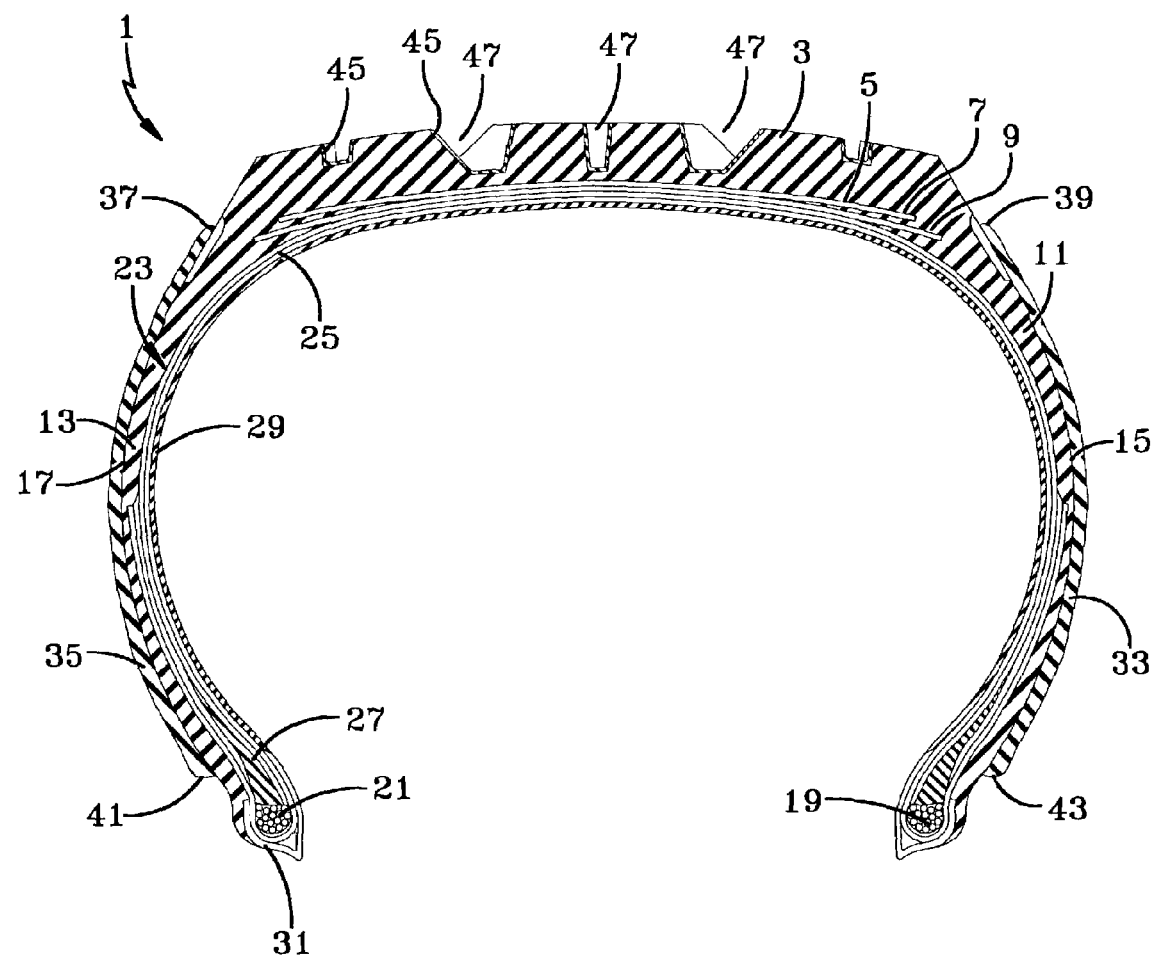
FIG. 1 is a cross-sectional view of a tire according to one aspect of the present invention.

There is disclosed a pneumatic tire having an outer-facing surface area, the improvement comprising an outer layer of a coating composition on the surface area containing a fluorinated silane covering said sidewall in whole or in part and said fluorinated silane being of the formula:

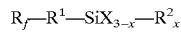

wherein $R_f$ is a perfluorinated group optionally containing one or more heteroatoms; $R^1$ is a divalent alkylene group, arylene group or mixture thereof, substituted with one or more heteroatoms or functional groups, containing about 2 to about 16 carbon atoms; $R^2$ is a lower alkyl group; X is a halide, a lower alkoxy group or an acyloxy group; and x is 0 or 1.

The pneumatic tire 1 of the present invention has a tread 3 and a belt reinforcing structure 5 which comprise at least one circumferentially reinforcing belt 7, 9. For purposes of the disclosure, "tread" means the rubber or elastomeric component that includes the portion of the tire that comes into contact with the road under normal inflation and load. The pneumatic tire 1 has a pair of sidewalls 11, 13 each having an outer facing sidewall area 15, 17. The outer facing sidewall area 15, 17 extends from opposing edges of the belt reinforcing structure 5 to corresponding tire beads 19, 21. "Sidewall" means that portion of the tire between the tread and the bead. The tire is further characterized by a carcass 23 with one or more plies reinforced by biased or radially extending synthetic or metal cords 25, an apex 27, an air-resistant innerliner 29 and a rubber chafer 31 common in tubeless-type tires. Tube-type tires may also incorporate the veneer described herein.

In the embodiment of FIG. 1, the pneumatic tire 1 has an outer layer of coating 33, 35 covering the outer facing sidewall area 15, 17. The coating may be applied on one of the outer surfaces 15 or 17 of the sidewall of the tire 1 or may be applied to both sidewall surfaces 15, 17 of the tire 1. The coating may be applied so as to start near the outer area 37, 39 of the sidewall near the edge of the belt structure and extend to the outer area 41, 43 of the sidewall near the corresponding tire beads 19, 21.

In accordance with another embodiment, the outer layer of coating 45 may appear as an outer layer to the grooves 47 in the tread 3. "Grooves" as used herein means an elongated void area in a tread that may extend circumferentially or laterally about the tread in a straight, cured or zigzag manner.

The dimensions of the coating on the sidewall may vary. Generally, the coating ranges from 2 to 7 inches (5 to 18 cm) in width. The thickness of the coating may range from 5 to 200 nm (nanometers). Preferably, the thickness of the coating ranges from 5 to 30 nm (nanometers).

The present invention provides a protective coating on the tire sidewall that is relatively durable, and more resistant to adhering dirt and easier to clean than the sidewall surface itself. The protective coating includes a monolayer of material covalently bound to the surface of the sidewall.

The coating composition comprises a fluorinated siloxane prepared by applying a coating composition (typically a solution) comprising a fluorinated silane of the following formula I:

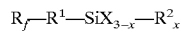

wherein $R_f$ is a perfluorinated group optionally containing one or more heteroatoms; $R^1$ is a divalent alkylene group, arylene group or mixture thereof substituted with one or more heteroatoms or functional groups, containing about 2 to about 16 carbon atoms; $R^2$ is a lower alkyl group (i.e. a $(C_1-C_4)$ alkyl group); X is a halide, a lower alkoxy group (i.e. a $(C_1-C_4)$ alkoxy group, preferably a methoxy or ethoxy group) or an acyloxy group (i.e. OC(O)R³ wherein R³ is a (C₁–C₄) alkyl group); and x is 0 or 1. Preferably, if the X groups include alkoxy groups, at least one acyloxy or halide group is present.

The present invention also provides methods of applying coating composition to a tire sidewall. In one embodiment, the method comprises treating the surface of the sidewall with a coating composition comprising a fluorinated silane without subsequent processing. Another method of applying the coating to the sidewall involves surface treating the sidewall surface with a coating composition comprising less than about 0.5 weight percent of a fluorinated silane for less than 30 minutes. The fluorinated silane is represented by the above formula I.

In another method of the present invention, the substrate is immersed in a coating composition comprising less than about 0.5 weight percent of a fluorinated silane for less than about 20 minutes and removing the coated tire, wherein upon removal the coated substrate emerges substantially autophobic.

The coating composition includes a self-assembled fluorinated siloxane film (i.e. a fluorine-containing polyorganosiloxane film), wherein the organic group includes other heteroatoms and/or functional groups. As used herein, "self-assembled" refers to spontaneous adsorption of the active coating ingredient to the sidewall surface. The coating composition typically includes an approximately monolayer-thickness base film, which is believed to be covalently attached to the sidewall surface. On this monolayer base film is adsorbed coating material, which is believed to be relatively low molecular weight oligomeric fluorinated siloxane material (i.e. fluorine containing polyorganosiloxane material having other heteroatoms and/or functional groups) that is loosely bound to the base film. This oligomeric material can be of varying thickness, depending on process conditions, and can be readily removed by rinsing with an organic solvent. Preferably, however, upon initial formation, the oligomeric fluorinated siloxane material is typically present in an amount that does not substantially change the characteristics of the sidewall. Thus, the overall thickness of the coating comprises the monolayer base film and oligomeric material.

A coating composition used in the present invention can be applied to the surface of the substrate by a variety of techniques. Preferably, the sidewall surface is treated with a coating composition (typically, a solution) comprising a fluorine-substituted silane (i.e., fluorinated silane) containing an organic moiety with heteroatoms or functional groups. All surfaces or a portion of only one surface of the sidewall may be treated. Although a wide variety of treatment modes can be used, such as spraying, casting, rolling, or immersing, a preferred treatment mode is spraying. The coating composition is typically a relatively dilute solution, preferably containing less than about 2.0 weight percent of the fluorinated silane, more preferably, less than about 0.5 weight percent of the fluorinated silane, and most preferably, less than about 0.3 weight percent of the fluorinated silane.

Significantly, the article to be coated is typically contacted with the coating composition (typically, a coating solution) at room temperature (i.e. about 20° C. to about 25° C.) for a relatively short period of time. After a short period of time in contact with the coating composition (as by immersing), the substrate is withdrawn at such a rate that the surface preferably emerges substantially autophobic (i.e., substantially completely dry with little or no adhering film or droplets of coating composition). Typically, the contact time (i.e., the total time the substrate is in contact with the coating composition) is less than about 30 minutes. Preferably, the contact time is less than about 20 minutes, more preferably, less than about 10 minutes, and most preferably, less than about 5 minutes. These contact times are significantly shorter than those conventionally used, which are typically about 30 minutes to about 120 minutes or longer.

Substantially no post-treatment of the coating, such as baking at elevated temperatures to cure the coating, polishing, or solvent washing, may be necessary to achieve the desired characteristics. In contrast, certain conventional methods often require a heating step after applying a coating composition to cure the coating and impart mechanical stability. However, such as when compounds of formula I wherein all the X groups are alkoxy groups are used to prepare the coating, a subsequent heat treating step may be required. Certain conventional methods may also require a polishing step or solvent washing step after applying the coating composition to remove excess material. Although in some applications, a stream of nitrogen or dry air may be needed to remove a slight excess of coating composition, preferably, there is no adhering film or droplets of excess coating composition on the substrate upon removal from the coating composition. The absence of excess coating composition on the substrate is enhanced by using a sufficiently clean substrate and removing the substrate from the coating composition at a sufficiently slow rate (typically, at a rate of about 0.1 centimeter/second to about 2.5 centimeters/second, and preferably, at a rate of about 0.5 centimeter/second).

As stated above, a coating of the present invention is prepared by applying a coating composition of a fluorinated silane. Preferably, the fluorinated silane includes an organic moiety with heteroatoms or functional groups. More preferably, the fluorinated silane is of the following formula I:

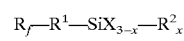

wherein $R_f$ is a perfluorinated group optionally containing one or more heteroatoms (typically oxygen atoms); the connecting group $R^1$ is a divalent alkylene group, arylene group or mixture thereof, substituted with one or more heteroatoms (e.g. oxygen, nitrogen or sulfur) or functional groups (e.g. carbonyl, amido or sulfonamido), containing about 2 to about 16 carbon atoms (preferably about 3 to about 10 carbon atoms); $R^2$ is a lower alkyl group (i.e. a (C₁–C₄) alkyl group, preferably a methyl group); X is a halide, a lower alkoxy group (i.e. a (C₁–C₄) alkoxy group, preferably a methoxy or ethoxy group) or an acyloxy group (i.e. OC(O)R³ wherein R³ is a (C₁–C₄) alkyl group); and x is 0 or 1. Preferably, x=0 and if the X groups include alkoxy groups, at least one acyloxy or halide group is present. More preferably, X is a halide or an acyloxy. Even more preferably, each X is a halide, and most preferably, each X is chloride.

The perfluorinated group ($R_f$) can include linear, branched, or cyclic structures, that may be saturated or unsaturated. It is preferably a perfluoroalkyl group ($C_nF_{2n+1}$) wherein n is about 4 to about 20, more preferably, about 6 to about 12, and most preferably, about 7 to about 10. The divalent $R^1$ group can include linear, branched, or cyclic structures, that may be saturated or unsaturated. Preferably, the divalent $R^1$ group is a linear group containing heteroatoms or functional groups. Typically, suitable fluorinated silanes include a mixture of isomers (e.g., a mixture of compounds containing linear and branched perfluoroalkyl groups). Mixtures of fluorinated silanes exhibiting different values of n can also be used.

Examples of preferred fluorinated silanes include, but are not limited to, the following: $C_7F_{15}CH_2OCH_2CH_2CH_2SiCl_3$; $C_7F_{15}CH_2OCH_2CH_2CH_2Si(CH_3)Cl_2$; $C_7F_{15}CH_2OCH_2CH_2CH_2SiCl(OCH_3)_2$; $C_7F_{15}CH_2OCH_2CH_2CH_2SiCl_2(OC_2H_5)$; $C_8F_{17}SO_2N(Et)CH_2CH_2CH_2SiCl_3$; $C_8F_{17}SO_2N(Me)CH_2CH_2CH_2Si(CH_3)Cl_2$; and $C_7F_{15}CH_2OCH_2CH_2CH_2Si(OAc)_3$. Although similar compounds containing three alkoxy groups (e.g., —$OCH_3$) on the silicon atom can be used, they are less desirable because they require a subsequent heat treatment step for effective characteristics. Mixtures of such compounds can be used if desired.

Such compounds, as well as other compounds of the above formula I, undergo reaction with the substrate surface to form a siloxane coating that has a strong interaction with the substrate surface, through the formation of covalent bonds, for example. For the preparation of a durable coating, sufficient water should be present to cause the formation of such an interaction between the fluorinated siloxane coating and the substrate surface. It is believed that the interaction is formed as a result of hydrolysis of the silane end groups (e.g., chlorosilanes) with residual water, which is either in the coating composition or adsorbed to the substrate surface, for example, and then condensation of the resulting silanol groups on the substrate surface. Typically, sufficient water is present for the preparation of a durable coating if the coating method is carried out at room temperature in the atmosphere having a relative humidity of about 30 percent to about 50 percent.

The solvent system used in the coating composition preferably includes one or more solvents that provide a substantially autophobic coating. As used herein, a "substantially autophobic coating" is one that has no adhering film or droplets of excess coating composition on the substrate immediately upon removal from the coating composition, or has only a slight amount of the coating composition that can be readily removed by a stream of nitrogen or dry air, for example. More preferably, the solvent system is one that provides a completely autophobic coating. An autophobic coating is formed as a result of the coating composition initially wetting the surface until the fluorinated silane reacts sufficiently with the surface to form a non-wetting surface that repels the remaining coating composition. This eliminates or substantially reduces the need to evaporate a solvent film after coating, which reduces solvent emissions. Furthermore, this prevents or substantially reduces deposition of excess material, which can destroy the characteristics of the substrate and must be removed in subsequent processing. Typically, a solvent or mixture of solvents capable of forming an autophobic coating is one with a surface tension of at least about 19 dynes/centimeter.

Preferred solvent(s) are those that are substantially inert (i.e., substantially non-reactive with the fluorinated silane), aprotic, and capable of dissolving the fluorinated silane. Examples of appropriate solvents include, but are not limited to, hydrocarbons, particularly alkanes such as heptane, decane, or paraffinic solvents, fluorinated hydrocarbons, particularly fluorine-substituted alkanes, ethers, particularly alkyl perfluoroalkyl ethers, and hydrochlorofluoro alkanes and ethers. More preferably, the solvent(s) are non-chlorinated and nonflammable. Mixtures of such solvents can be used. Particularly preferred solvents, because of a good balance of solubilization, coating autophobicity, and flammability properties, include mixtures of alkanes (such as the isoparaffinic solvents available under the trade designations "ISOPAR G" and "ISOPAR L" from Exxon Chemical, Baytown, Tex.) with alkyl perfluoroalkyl ethers (such as methyl perfluorobutyl ether and ethyl perfluorobutyl ether).

Although a solvent system that produces a substantially autophobic coating is particularly desirable and advantageous, other solvent systems can be used to prepare a coating of the present invention. For example, an alcohol such as isopropanol can be used. However, the resultant coatings may not have characteristics as desirable as if an aprotic solvent were used, for example. Furthermore, the resultant coatings may destroy the properties of the substrate surface.

A coating composition of the present invention containing a desired solvent system and a fluorinated silane may also include additives, such as stabilizers and adhesion promoters.

Preferably, the substrate (sidewall and groove) should be extremely clean prior to applying the coating for optimum coating characteristics. That is, the surface of the substrate to be coated should be substantially free of organic contamination prior to coating. A preferred method of removing such contamination prior to coating includes ultrasound cleaning in a solvent bath (e.g., ethanol/chloroform) for preliminary degreasing (if necessary), followed by final cleaning using a gas-phase discharge technique such as air plasma or air corona. Other methods of cleaning the substrate such as washing with detergent and/or hot water (about 48° C. to 67° C.) can be effective to obtain very clean surfaces, particularly when the samples are not extremely soiled.

Vulcanization of the pneumatic tire of the present invention is generally carried out at conventional temperatures ranging from about 100° C. to 170° C. Preferably, the vulcanization is conducted at temperatures ranging from about 100° C. to 150° C. Any of the usual vulcanization processes may be used such as heating in a press or mold, heating with superheated steam or hot air or in a salt bath. The vulcanization may precede or follow the application of the coating.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having an outer-facing surface area, the improvement comprising an outer layer of a coating composition on said surface comprising a fluorinated silane of the following formula:

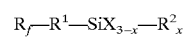

$$R_f\text{—}R^1\text{—}SiX_{3-x}\text{—}R^2{}_x$$

wherein $R_f$ is a perfluorinated group optionally containing one or more heteroatoms; $R^1$ is a divalent alkylene group, arylene group or mixture thereof, substituted with one or more heteroatoms or functional groups, containing about 2 to about 16 carbon atoms; $R^2$ is a lower alkyl group; X is a halide, a lower alkoxy group or an acyloxy group; and x is 0 or 1; wherein the coating composition comprises a self-assembled film and the coating composition has a thickness ranging from 5 nm to 200 nm.

2. The pneumatic tire of claim 1 wherein the outer layer of a coating composition is on the sidewall area extending from the opposing edges of a belt reinforcing structure to corresponding tire beads.

3. The pneumatic tire of claim 1 wherein the outer layer of a coating composition is on tread grooves in a tread of the pneumatic tire.

4. The pneumatic tire of claim 1 wherein $R^1$ contains from 3 to 10 carbon atoms.

5. The pneumatic tire of claim 1 wherein $R^2$ is a methyl group.

6. The pneumatic tire of claim 1 wherein X is a methoxy or ethoxy group.

7. The pneumatic tire of claim 1 wherein X is —OC(O)$R^3$ wherein $R^3$ is a ($C_1$–$C_4$) alkyl group.

8. The pneumatic tire of claim 1 wherein x is 0.

9. The pneumatic tire of claim 1 wherein X is a halide.

10. The pneumatic tire of claim 9 wherein X is chloride.

11. The pneumatic tire of claim 1 wherein the fluorinated silane is selected from the group consisting of $C_7F_{15}CH_2OCH_2CH_2CH_2SiCl_3$; $C_7F_{15}CH_2OCH_2CH_2CH_2Si(CH_3)Cl_2$; $C_7F_{15}CH_2OCH_2CH_2CH_2SiCl(OCH_3)_2$; $C_7F_{15}CH_2OCH_2CH_2CH_2SiCl_2(OCH_2H_5)$; $C_8F_{17}SO_2N(Et)CH_2CH_2CH_2SiCl_3$; $C_8F_{17}SO_2N(Me)CH_2CH_2CH_2Si(CH_3)Cl_2$; and $C_7F_{15}CH_2OCH_2CH_2CH_2Si(OAc)_3$ and mixtures thereof.

* * * * *